(12) United States Patent
Ritter et al.

(10) Patent No.: US 6,846,507 B1
(45) Date of Patent: Jan. 25, 2005

(54) LIQUID FATTY COMPONENT CONTAINING COMPOSITION

(75) Inventors: Heike Ritter, Kleve (DE); Robert Leo van de Sande, Vlaardingen (NL); Volkmar Muller, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/180,374

(22) PCT Filed: May 12, 1997

(86) PCT No.: PCT/EP97/02597

§ 371 (c)(1),
(2), (4) Date: Apr. 12, 1999

(87) PCT Pub. No.: WO97/42830

PCT Pub. Date: Nov. 20, 1997

(30) Foreign Application Priority Data

May 10, 1996 (EP) ............................................ 96201303

(51) Int. Cl.$^7$ .............................................. A23D 9/007
(52) U.S. Cl. ...................................... 426/611; 426/601
(58) Field of Search .......................... 426/601–611, 417

(56) References Cited

U.S. PATENT DOCUMENTS

| | | | | |
|---|---|---|---|---|
| 3,852,504 A | * | 12/1974 | Muharra | 426/417 |
| 5,292,537 A | * | 3/1994 | Hammond | 426/44 |
| 5,310,556 A | | 5/1994 | Ziegler | |
| 5,376,390 A | * | 12/1994 | Hammond | 426/44 |
| 5,512,307 A | * | 4/1996 | Hammond | 426/44 |
| 5,514,398 A | * | 5/1996 | Imai | 426/605 |
| 5,547,698 A | * | 8/1996 | Lansbergen | 426/602 |
| 5,552,167 A | * | 9/1996 | Taylor | 426/542 |
| 5,716,639 A | * | 2/1998 | Carlsson et al. | |
| 5,753,283 A | * | 5/1998 | Hammond | 426/417 |
| 5,843,499 A | * | 12/1998 | Moreau | 426/2 |
| 5,869,124 A | * | 2/1999 | Elliott | 426/603 |
| 5,985,344 A | * | 11/1999 | Cherukuri | 426/417 |
| 6,096,351 A | * | 8/2000 | Sassen | 426/33 |
| 6,162,483 A | | 12/2000 | Wester | |

FOREIGN PATENT DOCUMENTS

| | | |
|---|---|---|
| DE | 1 413 102 | 11/1975 |
| EP | 0 466 235 | 1/1992 |
| EP | 0 619 952 | 10/1992 |
| WO | 92 19640 | 11/1992 |
| WO | 96 38047 | 12/1996 |

OTHER PUBLICATIONS

Swern 1979 Baileys Industrial Oil and Fat Products, vol. 1 $4^{th}$ edition John Wiley & Sons New York p 407–409.*
International Search Report.
JP62148424 with Patent Abstracts of Japan.
JP57149212 with Patent Abstracts of Japan.
JP 06 298 645 with Derwent abstract.
JP 63 29588 with Derwent abstract.
JP60 006195 with Patent Abstracts of Japan.
JP 63 246 333 with Derwent abstract.
"Influence of Processing on Sterols of Edible Vegetable Oils", SP. Kopchhar; Prog. Lipid Res. 22 pp. 161–188.
"Separation of Vitamin E and gamma–Oryzanols from Rice Bran by Norma–Phase Chromatography", M. Diack and M. Sasaka, JAOCS vol. 71, No. 11, pp. 1211.

* cited by examiner

*Primary Examiner*—Carolyn Paden
(74) *Attorney, Agent, or Firm*—Gerard J. McGowan, Jr.

(57) ABSTRACT

It was found that by the addition of 2 different, specific sterols, which preferably are phytosterols, to a liquid fat, the liquid fat was no longer liquid, but showed a firmness, measured as Stevens hardness, significantly higher than that of the liquid fatty compound itself. Preferably, the liquid fat is an edible fat, and the sterols used is a mixture of phytosterols, preferably oryzanol and sitosterol at a minimum total weight level of 2%, preferably 4%, with a clear optimum at a molar ratio between 3:1 and 1:3, further preferred between 1:2 and 2:1. The composition is preferably used in consumer goods, such as cosmetic products or food products. Also these products comprising such a composition are part of the invention. After dissolution of the sterols in the fatty compound at elevated temperature, improvement of structuring capacity of the sterols was found by rapid cooling.

12 Claims, No Drawings

LIQUID FATTY COMPONENT CONTAINING COMPOSITION

BACKGROUND AND SUMMARY OF THE INVENTION

The present invention concerns an organogel containing composition, the organogel being largely composed of a liquid fatty component and a mixture of sterols.

The organogel of the invention has a firmness larger than that of the liquid fatty component when compared at the same temperature, normally room temperature. The liquid fatty component is herein referred to as liquid fat. Fats are commonly applied in a wide range of consumer products, including food and cosmetic products, and also in technical, non-consumer areas. In many of such applications, it is desired that the product comprising the liquid fat has some structure or firmness, meaning that the product is not as liquid and pourable as the liquid fat itself when comparing at similar conditions. Several methods are used for providing structure, the use of solid fats in addition to the liquid fat being one of the most commonly applied. In applications where in addition to the fat, also a non-fatty liquid, such as water, is present, also emulsifiers and/or thickeners and/or gelling agents are applied, so that the non-fatty liquid adds significantly to the firmness of the end product. In most applications, and in particular in compositions comprising high amounts of fat, solid fat is applied for structuring (or giving firmness to a products) for technical and practical reasons, in particular in fat continuous products comprising >50% of fat, preferably >60% of fat. At lower fat levels, a combination of solid fat, emulsifiers and thickeners and/or gelling agents is often used. However, in consumer products, in particular in food products, there is an increased desire to reduce or even do without the presence of solid fats for various reasons. For example, such reasons can be based on health concerns, as were fat is consumed, the consumer desires products with saturated fatty acid (SAFA) levels as low as possible, and, preferably, with low trans fatty acid levels (e.g., less than 4%). More preferred, fat containing products are even free of any trans fatty acid levels. Drawbacks sometimes have to do with increase of costs, and/or negative consumer perception of the ingredients used.

Thus, in one embodiment of the present invention, a method is found to replace part or all of the solid fat in a fat composition composed of solid fat alone or of a mixture of solid and liquid fat, by the use of an organogel as claimed herein. Alternatively, the invention is suitable for the reduction of the structuring material necessary to give firmness to the liquid fat containing composition. Another object of the present invention is to provide a new method for giving firmness to a liquid fat, in particular to a glyceride, without chemical modification. In the present application, a liquid fat means that the liquid fat is pourable at the temperature its application is envisaged. For most products, and in a preferred embodiment, this means at room temperature (20° C.). Examples of such liquid fats include liquid paraffins and liquid, organic fatty components as often applied in consumer products, for example polyol esters like mono-, di- and triglycerides.

The present invention now provides a composition comprising an organogel, the organogel being largely composed of a liquid fatty component, at least one sterol and at least one sterol ester. It is desired that both are present in an amount of at least 1 wt % each, based on the total amount of liquid fat used in the organogel. Preferably, all liquid fat present in the composition of this invention is formed into an organogel. In a particular embodiment the organogel comprises at least 75% liquid fat. In one embodiment of this invention, the composition claimed consists of an organogel composed of a liquid fat, a sterol (or mixture of different sterols) and a sterol ester (or mixture of different sterol esters). In another embodiment, other components are present as well. Preferably, the composition does not comprise water. Accordingly, the organogel of the present invention can be used in combination with other component, such as solid fat, with water, or combinations thereof, and may comprise any other component commonly applied and depending on the end use desired. Preferably, no components are used which negatively affect the firmness of the organogel itself. It is further preferred that in compositions in which water is present and for which a firmness of the organogel is still desired after a prolonged storage time, additional measures are taken. As an example, it is desired to used components which reduce the water activity. Thus, in the present composition, still solid fat can be present. For example, in a prior art composition composed of liquid and solid fat, the amount of solid fat can be reduced by the use of a mixture of sterol composed as envisaged in the present invention. In this embodiment it is preferred that not only part or all solid fat is replaced by liquid fat, but that all liquid fat in the composition is present in the form of an organogel. In a highly advantageous embodiment, the composition consists of an organogel and solid fat. It is preferred to use solid fat having a low SAFA level, say less than 10%, and a trans fatty acid level of less than 4%, preferably the solid fat being virtually free of trans fatty acids. As indicated above, in the composition of one of the embodiments of the present invention, other components commonly applied in the composition envisaged can be present. For example, in a margarine type of product, all or part of the solid fat present can be replaced by the organogel, and in addition, other components commonly present in such margarine type products such as solid fat, water, flavours, salt, and the like, can be present. In this specification, a sterol is a polycyclic alcohol, with at least 24 carbon atoms and at least 4 condensed rings, with a ring size of at least 3 atoms, preferably a ring size in the range of 3–6 atoms. In a preferred embodiment, the rings are almost planar ring systems such as found in cholesterol. In a further preferred embodiment, the hydroxyl groups (or C—O bonds) are positioned in the same plane as the ring system, i.e. equatorial and not axial. Sterol esters are, in this specification, esters of phenolic acids of the sterols defined above. The term phenolic acids relates to the family of cinnamic acids, of which caffeic acid and ferulic acid are examples. Very good results were obtained when the esterified sterol has a structure highly similar to that of the free sterol applied. In one particularly preferred embodiment, the free sterol is a ferulic acid, and the phenolic acid esterified sterol is a ferulic acid sterol ester. At present, it is believed that the free sterol or a component of similar chemical structure, and the phenolic acid esterified sterol or a component of similar chemical structure, tend to form aggregates when dissolved in the liquid and that these aggregates show a certain level of network formation or even polymerization in the liquid, which is then reflected in a structuring of the liquid. Hence the structuring of the liquid would resemble the formation of a gel known from aqueous gels. However, applicant does not wish to be bound by this theory. Examples of suitable combination of sterols and sterol esters selected from the group of phytosterols are oryzanol and sitosterol (often denoted by β-sitosterol). Also cholesterol is found to be a suitable component that can provide structure to a liquid fatty component when applied at specific levels in combination with other phytosterols.

An additional advantage of the present invention is found in that most of the sterols applicable for providing structure according to the present invention are components obtainable from natural sources. In a preferred embodiment of the invention, the sterols and/or sterol esters applied are components which can also be found in nature. For example, oryzanol and sitosterol are present as minor components in many plants. In quite some cases, these are even present in the plants from which triglycerides are obtained. It is to be noted, however, that the sterol (ester) components are not present in amounts sufficient to provide structuring in these natural sources, nor are these present in the mole ratios needed for obtaining sufficient structure. Also, in many cases, not all sterols needed for the structuring are present in the plants from which the oils are obtained. At present, these minor components are often partially removed during oil refining. Hence, one of the objects of the present inventions is to provide a new method for giving firmness to a liquid fat, in particular to an edible glyceride, without chemical modification of any of the ingredients being needed.

In particular, sterols and sterol esters found to be highly suitable for providing hardness to the liquid are selected from the group of phytosterols. In this invention the term phytosterol is used to cover the whole group of free phytosterols, phytosterol fatty acid esters and (acylated) phytosterol glucosides. There are three major phytosterols, namely beta-sitosterol, stigmasterol and campesterol. Schematic drawings of the components meant are as given in "Influence of Processing on Sterols of Edible Vegetable Oils", S. P. Kochhar; *Prog. Lipid Res.* 22: pp. 161–188. Sitosterol can, for example, be obtained from wood and from refining vegetable oil, and normally comprises also a minor amount of other sterols, like campesterol, stigmasterol, various avenasterols etc. For the present invention, it is not needed that the sterols and/or sterol esters used are highly pure; some impurities can be present, it is considered not to be of concern in particular, when the polarityiis relatively low.

Oryzanol consist of a mixture of ferulic acid esters of unsaturated triterpene alcohols and is also referred to as gamma-oryzanol. In this invention only the term oryzanol is used. For a further description and schematic drawing of oryzanol, reference is made to "Separation of Vitamin E and gamma-Oryzanols from Rice Bran by Normal-Phase Chromatography", M. Diack and M. Saska, *JAOCS* Vol. 71, no. 11, pp. 1211. Oryzanol can, for example, be obtained from ricebran, and comprises ferulic acid esters of several phytosterols. Cholesterol is, for obvious health reasons, less desired when the use of in food products is envisaged. For any other of the applications, however, it may be very well applicable. A highly suitable combination, in particular for food products, was found in the use of both oryzanol and sitosterol.

The organogel of the invention has a firmness larger than that of the liquid fat when compared at the same temperature, normally room temperature. In a highly preferred embodiment, firmness of the organogel consisting of liquid oil and a mixture of sterol and sterol esters according to the invention has a Stevens 4.4 hardness ("Stevens 4.4" value) of at least 20 grams measured at 20° C. The Stevens hardness St, expressed in grams, is determined 1 week after manufacturing the organogel when stored at 5° C. and thereafter equilibrated for 24 hours at the temperature as indicated, using a 4.4. mm. diameter cylinder in a Stevens— LFRA Texture Analyzer (ex. Stevens Advanced Weighing Systems, UK) load range 1000 g operated "normal" and set at 10 mm penetration depth and 2.0 mm/s penetration rate.

Thus, Stevens hardness is for this purpose considered a parameter sufficient to distinguish between the liquid fat and the "structured" liquid fat (the organogel).

The mixture of the sterol(s) and sterol ester(s) of the invention are capable of structuring a liquid fat when added to a liquid fat in an amount of at least 1 wt % each, based on the amount of liquid fat. The sterols and sterol esters have a limited solubility in liquid fat, the saturation point depending on the specific components used. In most cases, the amount sufficient for structuring is the level whereby all structure providing sterols and sterol esters are added at a total level equal or preferably, above the saturation point of the solution. In particular, the minimum total amount of sterols (i.e. sterols+sterol esters) is at least 2 wt % and preferably 3 wt %, based on the total amount of liquid fat present in the composition. The sterols and sterol esters are dissolved in the liquid fat, and it is believed, without wishing to be bound by theory, that the structuring is obtained by the sterols and sterol esters which are added at a level above the saturation of the solution, meaning that these are the not-dissolved sterols which are believed to provide the structure to the liquid. It was found that the molar ratio of sterols and sterol esters should be in the range of 1:10–10:1, preferably 1:5–5:1, whereby a preference exist for 1:3–3:1, towards almost equal molar ratio's, as it was found that an optimal structuring effect was obtained for providing firmness to a liquid fat, in particular a liquid triglyceride.

In one particular and preferred embodiment of the invention, the liquid fat is overall apolar. Surprisingly, it was found that almost all apolar liquid fats can be given firmness by the use of a combination of a sterol (mixture) and a sterol ester (mixture), which preferably is the ester of the specific sterol (mixture) used. The invention is in particular advantageous in the foods area, so that the use of edible liquid fat and edible sterol(s) and edible sterol ester(s) is preferred. Thus, for food products, the liquid fat is an edible fat, and the sterols used is a mixture of phytosterols, preferably oryzanol and sitosterol at a minimum total weight level of 2%, preferably 4%, with a clear optimum at a molar ratio between 3:1 and 1:3, further preferred between 1:2 and 2:1. After dissolution of the sterols in the fatty compound at elevated temperature, improvement of structuring capacity of the sterols was found by rapid cooling.

In a further preferred embodiment for food products, it was found that sitosterol and oryzanol provide significant and sufficient structure to an edible liquid acyl glyceride when both are present in a total amount of at least 2 wt % each, based on the liquid acyl glyceride fat. An optimum in providing hardness to a product was found in the use of oryzanol and sitosterol in about equal molar ratio in combination with the use of a liquid polyol ester, preferably a mono-, di- and/or triacyl glyceride. In addition thereto, the use of sitosterol and oryzanol in food products are nowadays believed to add beneficial health effects upon their daily intake, in particular with respect to a reduction of coronary heart diseases. For many applications, and in particular for food, the use of edible liquid acyl glycerides, in particular triacyl glycerides is preferred as the liquid fatty component. As suitable triacyl glycerides, fats and oils (here used as synonyms) both vegetable and animal fats obtained from natural and synthetic origin can be used. Preferred are liquid vegetable and/or animal fats obtained from natural sources. It is further preferred that these oils comprise a substantial amount of C14 to C22 glycerides, and further preferred a substantial amount of glycerides having C16–C20 triglycerides. The C-numbers refer to the number of carbon atoms per fatty acid group In another preferred embodiment, the liquid fatty compound comprises a substantial amount of saturated acyl glycerides, in particular saturated triglycerides, as the use thereof was found to be beneficial with respect to the hardness of the product. It was observed that a further increased amount of the structuring sterols is desired for compositions comprising high levels of unsaturated acyl glycerides compared to the levels needed for the same degree of structuring. The less unsaturated glycerides were used, the harder the product with a same amount of sterols present. In food products, it may be desired for health reasons, however, to use less saturated glycerides and a higher amount of sterols. The vegetable triglycerides often used in consumer products include those obtained from seeds, beans, fruits and nuts, or parts of these plant materials such as their germs, and are often obtained by mechanical expelling and/or solvent extraction. Examples of liquid triglycerides which are in particular suitable for use in the present invention are sunflower oil, rapeseed oil, flax or linseed oil, soybean oil, maizegerm or corn oil, wheatgerm oil, ricebran oil, palm oil, olive oil peanut oil, and the like. Also, oils of animal origin can be used in the present invention, and include those obtained from processing fish, for example, fish oil. Other liquid fats that can be applied in the present invention comprise or consist of sucrose polyol polyesters.

Within the scope of the present invention is a composition according to the main claim, in which the fat applied is a fat which is not liquid at room temperature. The term liquid fat regards fat which is liquid at the temperature applied. For example, fats can be applied at temperatures higher than room temperature whereby it is still desired that the fat at its application temperature is not liquid, but has some structure. As is well known, most fats melt at their heating, and also above there melting temperature they can be structured by means of the sterols as presently envisaged within the present invention. It will still be desired to use an amount at or above the level of saturation at the envisaged application temperature. Preferably, temperature of application of the organogel containing composition is less than 80° C., as it was found that the organogel becomes less stable at temperatures higher than that.

In another embodiment of the invention, a liquid fat or oil of vegetable or animal source is used as indicated above, to which, in addition to the sterols, at least 1 wt % based on the amount of liquid fatty compound used, of monoglycerides is added. It was found that an additional increase of hardness is obtained by the addition of 1% or more, e.g. 2–10% of monoglyceride, or that a reduction of the amount of sterols needed to obtain hardness or viscosity for the liquid fatty compound by the addition of a monoglyceride.

The composition according to the present invention can be prepared by the simple dissolution of the sterol(s) in the liquid fat. For example, a composition of significant hardness compared to the liquid itself is obtained by dissolving a phenolic acid ester of a sterol and a sterol by mixing the ingredients and stirring at elevated temperatures. For many fats and oils, a temperature of more than e.g. 40–50° C., often more than 75° C. or 85° C. will be sufficient, in some cases 90° C. degrees is desired in order to achieve rapid dissolving. As soon as a clear, transparent solution is obtained the liquid solution can be allowed to cool to, for example, ambient temperature. The formation of the structured system often proceeds rather slowly, and for some cases, it can take more than one day up to several days before the ultimate degree of structuring is achieved. It was found that a more rapid and even instantaneous structuring of the solution is obtained by applying rapid cooling. A very suitable means therefore is a surface scraped cooling device, for example a votator (A-unit).

DETAILED DESCRIPTION OF THE INVENTION

From a nutritional point of view, it s desired that in food products as little saturated fat (saturated fatty acid groups containing triglycerides) are present. Therefore, in these days, it is often desired to use untreated oils and fats having a high amount of unsaturated fatty acid groups. Such oils, however, are very often pourable at room temperature and therefore less suited for use in products that should have some firmness, such as spreads, dressings, mayonnaise and even squeezable margarines used as vegetable topping, creams, fillings and toppings. Up till now, these oils were treated by which treatment some firmness or hardness was obtained. However, such treatment has the serious disadvantage of saturating the unsaturated fatty acid groups. It is desired from a nutritional point of view, therefore, to use as much untreated oils and fat in a food product as the hardness allows to. With the present invention, now, firmness to a liquid oil or fat can be given by the addition of at least one sterol and at least one sterol ester in an amount of at least 1 wt % each, based on the liquid fat to which firmness is to be given.

The organogel is preferably used in consumer goods, such as cosmetic products or food products. Also these products comprising such a composition are part of the invention. Thus, the present invention allows to prepare fat based food products in which a dispersion of an organogel is used. Although it is very well possible to prepare food products in which all fat is present in the form of an organogel according to the present invention, in one embodiment the food product comprises fat in the form of a organogel as defined in this application and another (solid) fat.

The present invention is now further illustrated by way of following examples. In the examples, percentages are weight percentages, unless indicated otherwise. The degree of structuring of the samples was determined by means of a Stevens penetrometer under the conditions:

probediameter: 6.4 mm;

penetration depth: 20 mm;

penetration rate: 20 mm/s;

temperatures: ambient (ca 20° C.).

EXAMPLE I

For the determination of the solubility of the ricebran specific phytosterol "oryzanol", comprising ferulic acid esters for several phytosterols, in a refined sunflower oil, 1–10% of the pure oryzanol (obtained from Tsuno Rice Fine Chemicals Co Ltd, Japan, >98% ferulic acid esters) and β-sitosterol (ex Kaukas Oy, Chemical Mill, Finland, comprising 92% B-sitosterol, 7% campesterol and about 1% artenols. Average Mw was 413), were admixed to the oil at elevated temperatures between 50 and 100° C., while stirring until a clear and transparent solution was obtained.

The solubility of oryzanol in sunflower oil, defined as the (w/w) concentration that gives a clear solution after a prolonged keeping time at a certain temperature, was established to increase about linearly from ca 2% at 20° C. to ca 10% at 90° C.

When a saturated solution was allowed to cool down and kept for a prolonged time in order to cope with often occurring retarded crystallization—supersaturation—the solution showed the formation of discrete oryzanol crystals at the bottom of the jar. Under these circumstances no structuring of the oil phase was observed at all (=experiment no. I.1).

Similar solubility determinations were performed with a pure wood based sitosterol product consisting of ca 92% of genuine sitosterol and about 8% of campesterol. The solubility of this sitosterol in refined sunflower oil was found to be ca 1% at 20° C. and linearly increasing to ca 4% at 90° C., the presence of a small amount of it in the pure oil not taken into account.

When the temperature was allowed to drop to below the saturation temperature the sitosterol solution too showed precipitation of sitosterol crystals after some time. Also in these solubility tests no structuring phenomena were noticed at all (=experiment nr. I.2).

In order to check the solubility for the different phytosterols, solubility experiments were also carried out with combinations of both the sterols dissolved in the oil. These solutions of the combined phytosterols remained liquid as long as the temperature was kept above say 50° C.

Very surprisingly it was established that, starting at a level of approx. 2% of oryzanol and 2% of sitosterol dissolved in the sunflower oil, the solution of the phytosterols became jelly and even solid after some days when the solutions were cooled down to ambient temperatures and stirring was not applied anymore (=experiment no. I.3).

EXAMPLE II

The unexpected structuring capability of the combined dissolving of oryzanol and sitosterol in liquid sunflower oil was further elucidated by performing a series of dissolving experiments with the mass ratio oryzanol:sitosterol as a variable. The constant conditions in this series of experiments follow from the description of the treatment:

- put 94.0 g of refined (and winterized) sunflower oil in a stirred glass beaker;
- admix the required amounts of oryzanol and sitosterol to the oil at a constant total sterol concentration level of 6.0%;
- increase the temperature of the mixture to 90° C. while stirring;
- continue stirring for 30 min after achieving a clear solution;
- allow the solution to cool to ambient temperature;
- keep the solution at rest at ambient temperature for 6 days;

The Stevens' hardness results in grams force measured in solutions containing varying amounts of oryzanol and sitosterol, are listed in Table II. Experiment II.1 and II.9 are comparative Examples.

TABLE II

| exp. no: | oryzanol [g] | sitosterol [g] | mol ratio ory:sito | hardness [g] |
|---|---|---|---|---|
| II.1 | 5.55 | 0.45 | 8.36 | 0 |
| II.2 | 5.01 | 0.99 | 3.46 | 13 |
| II.3 | 4.43 | 1.57 | 1.92 | 25 |
| II.4 | 3.90 | 2.10 | 1.27 | 37 |
| II.5 | 3.56 | 2.44 | 1.00 | 57 |
| II.6 | 3.54 | 2.46 | 0.98 | 57 |

TABLE II-continued

| exp. no: | oryzanol [g] | sitosterol [g] | mol ratio ory:sito | hardness [g] |
|---|---|---|---|---|
| II.7 | 2.96 | 3.04 | 0.66 | 81 |
| II.8 | 2.01 | 3.99 | 0.34 | 31 |
| II.9 | 0.96 | 5.04 | 0.13 | 0 |

This series of experiments clearly shows the structuring phenomenon when the two phytosterols considered are dissolved in the sunflower oil together.

EXAMPLE III

The total phytosterol concentration is illustrated by the following example:

Ratio and total weight amount are listed in the table below. The other constant conditions during these tests were as described in example II, except for a variable amount of sunflower oil involved (listed in the table) and the keeping time, which was 3 days in this experiment. The results of these treatments are listed in the following table:

TABLE III

| exp. no | oryzanol [g] | sitosterol [g] | oil [g] | sterols [%] | hardness [g] |
|---|---|---|---|---|---|
| III.1 | 2.37 | 1.63 | 96.0 | 4.0 | 0 |
| III.2 | 3.56 | 2.44 | 94.0 | 6.0 | 26 |
| III.3 | 5.34 | 3.66 | 91.0 | 9.0 | 1057 |
| III.4 | 7.12 | 4.88 | 88.0 | 12.0 | 1901 |
| III.5 | 9.49 | 6.51 | 84.0 | 16.0 | 3520 |

From this table it follows that the hardness of the structured sunflower oil increases substantially when increasing the total amount of the phytosterols. Example III.1 turned out not to have any hardness at the time of measurement. However, in an additional experiment, a composition the Stevens hardness was found to be about 20 after 26 days

EXAMPLE IV

In this series of experiments the varied conditions were:

holding time after cooling: 1–4–7 days;

holding temperature: 5–15–25° C.

The total sterol concentration was kept at 5% now and the molecular ratio oryzanol:sitosterol 1:1. The Stevens hardness measurement was performed at ambient temperature. The dissolving was performed in a stirred and baffled, double walled, glass reactor. The results are listed in the following table:

"effect of time, temperature and sterol ratio on hardness"

| exp. no. | time (days) | temp. (° C.) | hardness (g) or:sito 1:1 | hardness (g) or:sito 2:1 | hardness (g) or:sito 1:2 |
|---|---|---|---|---|---|
| IV.1 | 1 | 5 | 0 | 807 | 565 |
| IV.2 | 1 | 15 | 0 | 857 | 548 |
| IV.3 | 1 | 25 | 0 | 5 | 14 |
| IV.4 | 4 | 5 | 185 | 860 | 568 |
| IV.5 | 4 | 15 | 1 | 753 | 623 |
| IV.6 | 4 | 25 | 0 | 90 | 38 |
| IV.7 | 7 | 5 | 209 | 920 | 622 |
| IV.8 | 7 | 15 | 18 | 783 | 661 |
| IV.9 | 7 | 25 | 10 | 254 | 190 |

From these results it is clear that the structuring requires several days and that it proceeds faster at the lower temperature. Again, at a further prolonged standing of the compositions, the hardness was found to further increase. A rapid structuring occurred at using a votator (A unit) for cooling down the compositions.

EXAMPLE V

Several different types of liquid triglyceride oils, with a different degree of unsaturation were used in this experiment. The oils used were obtained from: palm olein, olive, ricebran, rapeseed, sunflower and flax or linseed oil. The palm olein stemmed from a dry fractionation at 15° C.

These experiments were performed at the following conditions:

total sterol concentration: 6%;
weight ratio oryzanol:sitosterol: 1:1;
dissolving temperature: 90° C.;
holding time: 6 days;
holding temperature: 20° C.
The Stevens' hardness results achieved are listed below:

TABLE V

| exp. no | oil | hardness [g] |
| --- | --- | --- |
| V.1 | olive | 127 |
| V.2 | rice bran | 73 |
| V.3 | rapeseed | 84 |
| V.4 | sunflower | 81 |
| V.5 | flax seed | 22 |

EXAMPLE VI

The influence of using the animal cholesterol instead of sitoeterol on the structuring behaviour was checked by performing structuring with 46 g of sunflower oil+3 g of oryzanol+1 g of cholesterol. Soon after dissolving the animal and the vegetable sterols in sunflower oil at 90° C. the structuring behaviour became visible. See the next table:

TABLE VI

| exp. no | 2nd component | description | hardness [g] |
| --- | --- | --- | --- |
| VI.1 | sitosterol | reference | 81 |
| VI.2 | cholesterol | rapidly solidified | 78 |

During the first couples of days the cholesterol structured oil looked very transparent but after some time the sample became more "hazy" like with all previous tests.

EXAMPLE VII

The refined sunflower oil used for the trials described sofar still can contain small amounts of polar matter like di- and monoglycerides and free fatty acids. For testing sterols structuring in purified triacylglycerol refined and winterized sunflower oil was additionally SiO2-column treated at ambient temperature under the following conditions:

1 part of oil dissolved in 2 parts of hexane;
column treatment with silicagel (no 60 ex Merck)
In the purified oil 3% of oryzanol and 3% of sitosterol were dissolved at 90° C. After 6 days holding at ambient temperature a very hard structure was obtained with the purified triglyceride oil reflected in 1049 g Stevens' hardness.

EXAMPLE VIII

The influence of the presence of varying amounts of monoglycerides in refined sunflower oil was established by structuring experiments nos. VIII.1–4 without and with admixing 3, 6 or 9% of pure monoacylglycerol (mag) (Hymono) The hardness results are listed in the table below:

TABLE VIII

| exp. no | description | hardness [g] |
| --- | --- | --- |
| VIII.1 | sunflower ref. | 61 |
| VIII.2 | 3% monoacyl glycerol (MAG) | 168 |
| VIII.3 | +6% MAG | 325 |
| VIII.4 | +9% MAG | 441 |

TABLE VIII

| exp. no | description | hardness [g] |
| --- | --- | --- |
| VIII.1 | sunflower ref. | 81 |
| VIII.2 | 3% monoacyl glycerol (MAG) | 168 |
| VIII.3 | +6% MAG | 325 |
| VIII.4 | +9% MAG | 441 |

From this table it follows that the addition of pure monoglycerides has a positive effect on the hardness of the sterols structuring.

EXAMPLE IX

A series of structuring tests was performed with a number of different organic non-triglyceride liquids with 6% total sterols concentration and at a molar ratio of 1:1 of oryzanol:sitosterol. The results are given in the following table:

| "phytosterol structuring in non-TAG liquids" | | | |
| --- | --- | --- | --- |
| exp. nr. | liquid | type | hardness (g) |
| IX.1 | water | inorganic | 0 |
| IX.2 | methanol | alcohol | 0 |
| IX.3 | ethanol | — | 0 |
| IX.4 | isopropyl alcohol | — | 0 |
| IX.5 | propylene glycol | diol | 131 |
| IX.6 | glycerol | triol | 0 |
| IX.7 | acetone | ketone | 0 |
| IX.8 | acetic acid | acid | 0 |
| IX.9 | oleic acid | — | <5 |
| IX.10 | hexane | alkane | 26 |
| IX.11 | paraffine oil | — | 867 |

The results show quite significant structuring ability by phytosterols in paraffine oil, propylene glycol, hexane and to a certain extent oleic acid.

EXAMPLE X

Mixing sterols structured sunflower oil at ambient temperature with demineralized water at increasing oil:water ratio, in steps of 10%, resulted in white coloured stable soft emulsions from a 50:50 ratio or higher. At lower ratio's the oil phase remained as a separate phase in the water. When mixing oryzanol and sitosterol containing sunflower oil— total sterol concentration of about 6% and at a 1:1 molar ratio—with 20% of water, a quite hard margarine like spread was obtained by applying rapid cooling in a votator (A-unit)

at a temperature profile of 60–90° C. to 0–5° C. After a few days in the fridge, the spread obtained became soft and could very well be applied as a squeezable margarine.

EXAMPLE XI

In this experiment, spreads were prepared comprising the organogel and water. The organogel was prepared from ultrasitosterol (a sterol obtained from wood pulp), the oryzanol was obtained from Kaukas Oy.

Two series were prepared, both prepared by preparing two separate phases, i.e. an aqueous and a fat phase, and combining these phase after a pre-treatment in a C-unit. The pre-treatment of the fat phase encompassed the heating of the fat phase ingredients to 90° C., cooling to 60° C., passing the composition through an A unit so as to rapidly cool down to 15° C.

The aqueous phase was prepared by heating the combined ingredients to 60° C., passing it through an A-unit so as to rapidly cool down to 15° C.

In Example XI.A, the aqueous phase contained, salt, syrup, or no additives; the concentration of sterol:sterolesters (1.1 m/m) was 5 wt % on the fat phase. Example XI.A encompasses 6 experiments, including 1 reference example. Results are provided in the following table:

TABLE XI.A

| exp | fat + sterols [%] | H$_2$O [%] | NaCl [%] | Syrup [%] | Stevens after 2 days | Stevens after 5 days |
|---|---|---|---|---|---|---|
| A.1 | 84.5 | 15.5 | 0 | 0 | 70 | 67 |
| A.2 | 84.6 | 12.6 | 2.77 | 0 | 108 | 125 |
| A.3 | 82.4 | 13 | 4.57 | 0 | 100 | 94 |
| A.4 | 81.4 | 7.0 | 0 | 11.6 | 117 | 122 |
| A.5 | 81.0 | 2.7 | 0 | 16.4 | 141 | 153 |

In Example XI.B, the aqueous phase contained about 12% of the total fat content, and so, the aqueous phase was a pre-mix in itself. All sterols were added to the fat phase. Accordingly, the sterol concentration in the fat phase was 5.65%, whereas the sterol concentration based on the total amount of fat in the composition was 5%. To the fat phase, 0.5% Dimodan BP and a minor amount of carotene were added.

TABLE XI.B

| exp. | fat + sterols [%] | H$_2$O [%] | NaCl [%] | Syrup [%] | Stevens after 2 days | Stevens after 5 days |
|---|---|---|---|---|---|---|
| B.1 | 95.5 | 4.5 | 0 | 0 | 34 | 36 |
| B.2 | 95.5 | 3.7 | 0.81 | 0 | 133 | 138 |
| B.3 | 95.4 | 3.4 | 1.19 | 0 | 157 | 192 |
| B.4 | 95.3 | 1.8 | 0 | 2.97 | 105 | 120 |

TABLE XI.B-continued

| exp. | fat + sterols [%] | H$_2$O [%] | NaCl [%] | Syrup [%] | Stevens after 2 days | Stevens after 5 days |
|---|---|---|---|---|---|---|
| B.5 | 94.8 | 0.7 | 0 | 4.45 | 197 | 203 |
| ref | 100 | 0 | 0 | 0 | 245 | 302 |

What is claimed is:

1. Composition comprising an organogel, the organogel including a liquid fatty component, at least one sterol and at least one sterol ester, wherein the molar ratio of sterols to sterol esters is in the range of 1:5 to 5:1 and wherein the organogel in the composition has a stevens 4.4 hardness of at least 20 grams, measured at 20° C.

2. Composition according to claim 1, wherein the total amount of sterol and the total amount of sterol ester is at least 1 wt % for each based on the amount of the liquid fatty component.

3. Composition according to claim 1, wherein the composition consists of a liquid fat, a stero or mixture of different sterols, and a sterol ester or mixture of different sterols, and, optionally, monoglycerides.

4. Composition according to claim 1 wherein the composition does not comprise water.

5. Composition according to claim 1, wherein the sterol and the sterol esters are selected from the group of phytosterols.

6. Composition according to claim 5, wherein the sterol is a sitosterol and the sterol ester is oryzanol.

7. Composition according to claim 1, wherein the total amount of sterols is at least 3 wt %, based on the total amount of liquid fat present in the composition.

8. Composition according to claim 1, wherein the molar ratio of sterols and sterol esters is in the range of 1:3 to 3:1.

9. Composition according to claim 1, wherein monoglycerides are present.

10. Composition according to claim 1, wherein the composition is a food product and the fat present is edible fat, and the sterols and sterol esters applied are edible components.

11. Composition according to claim 10, wherein the food product is a spread, a squeezable margarine, a dressing or mayonnaise.

12. A method for giving firmness to a liquid fat comprising use of an organogel including a liquid fatty component, at least one sterol and at least one sterol ester, wherein the molar ratio of sterols to sterol esters is in the range of 1:5 to 5:1 and wherein the organogel in the composition has a stevens 4.4, hardness of at least 20 grams, measured at 20° C.

* * * * *